Feb. 23, 1937.    R. THOMPSON    2,071,592
VEHICLE BODY
Filed March 8, 1935    3 Sheets-Sheet 1
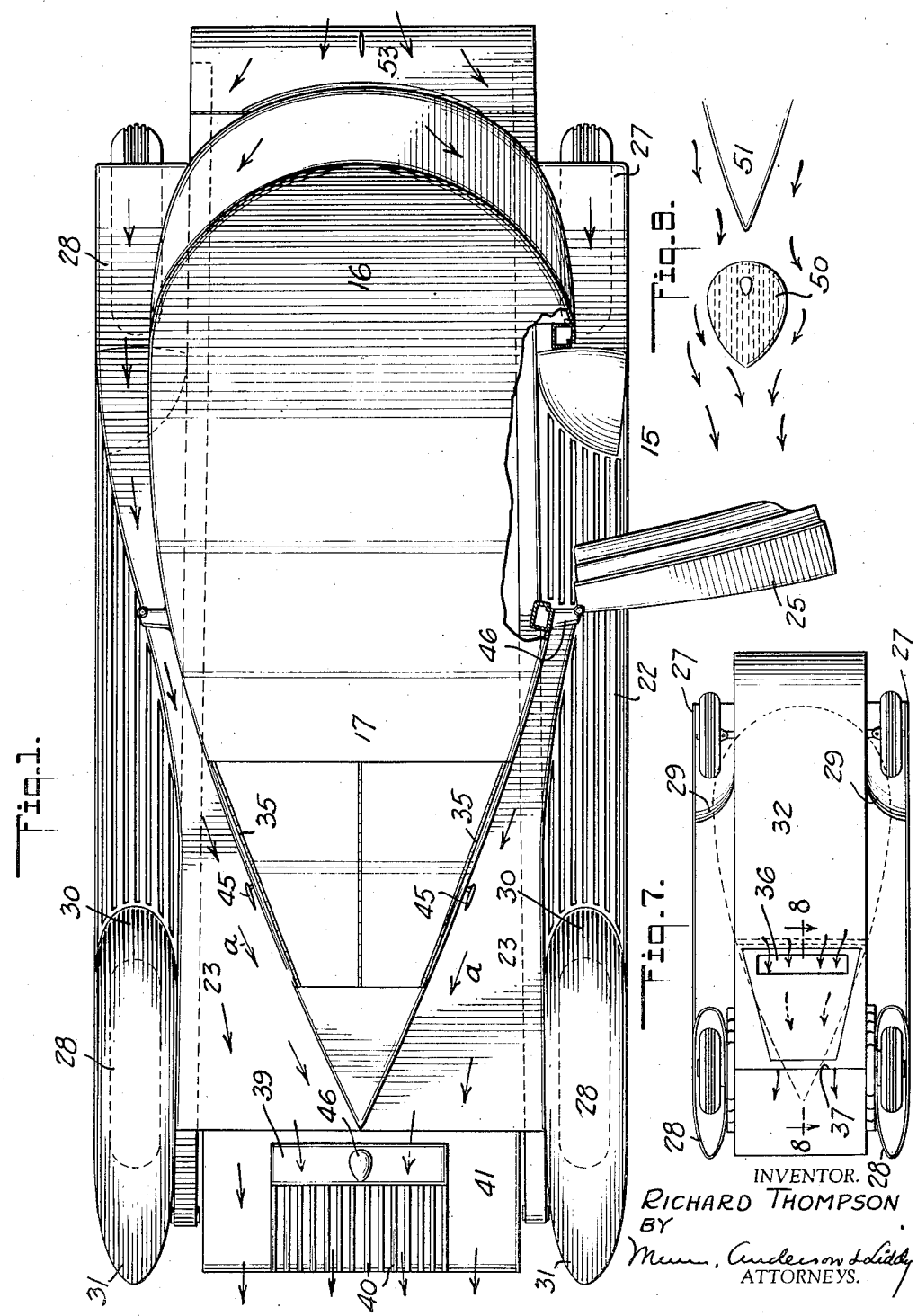
INVENTOR.
RICHARD THOMPSON
BY
Munn, Anderson & Liddy
ATTORNEYS.

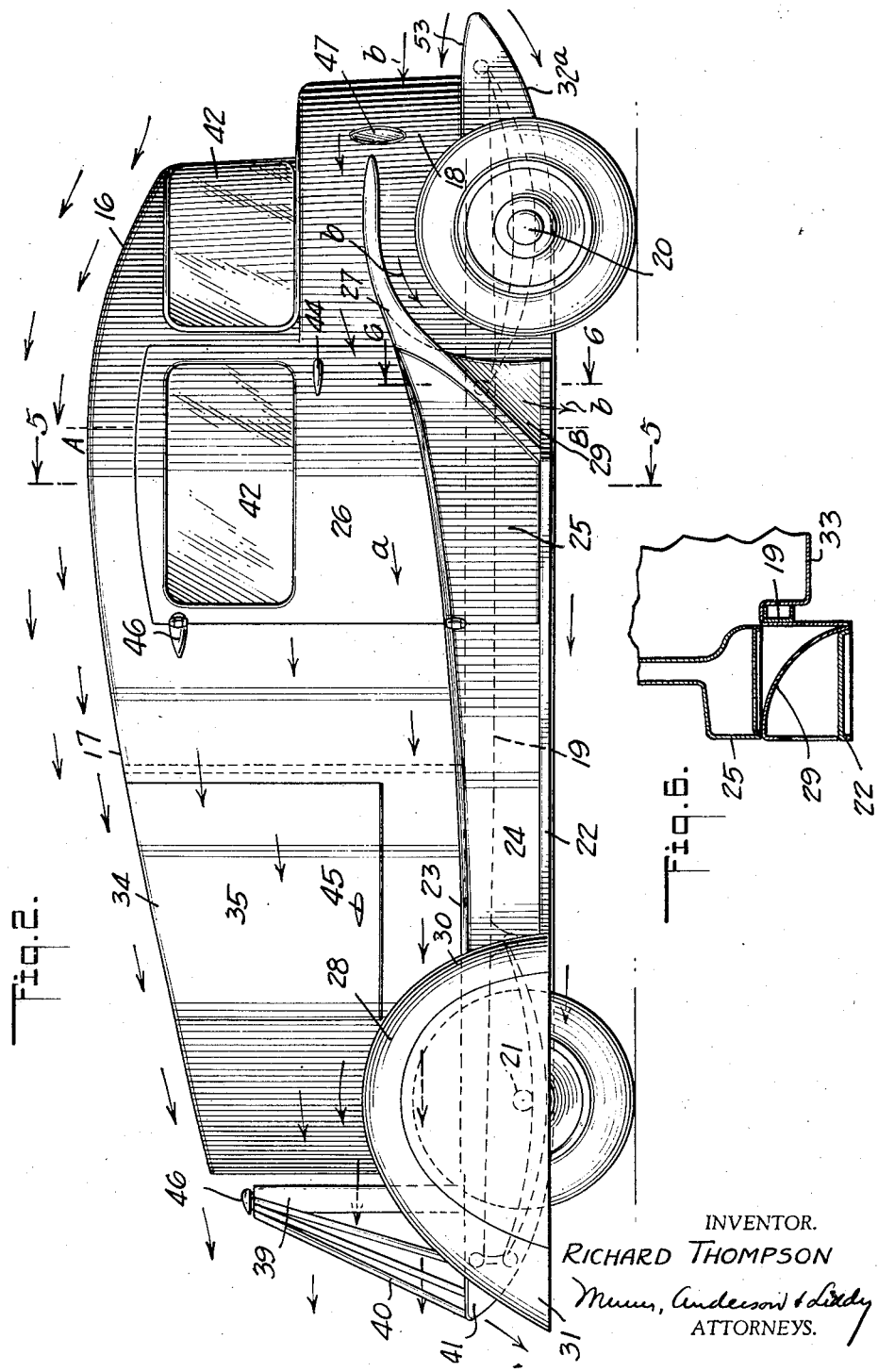

Feb. 23, 1937. R. THOMPSON 2,071,592
VEHICLE BODY
Filed March 8, 1935 3 Sheets-Sheet 3
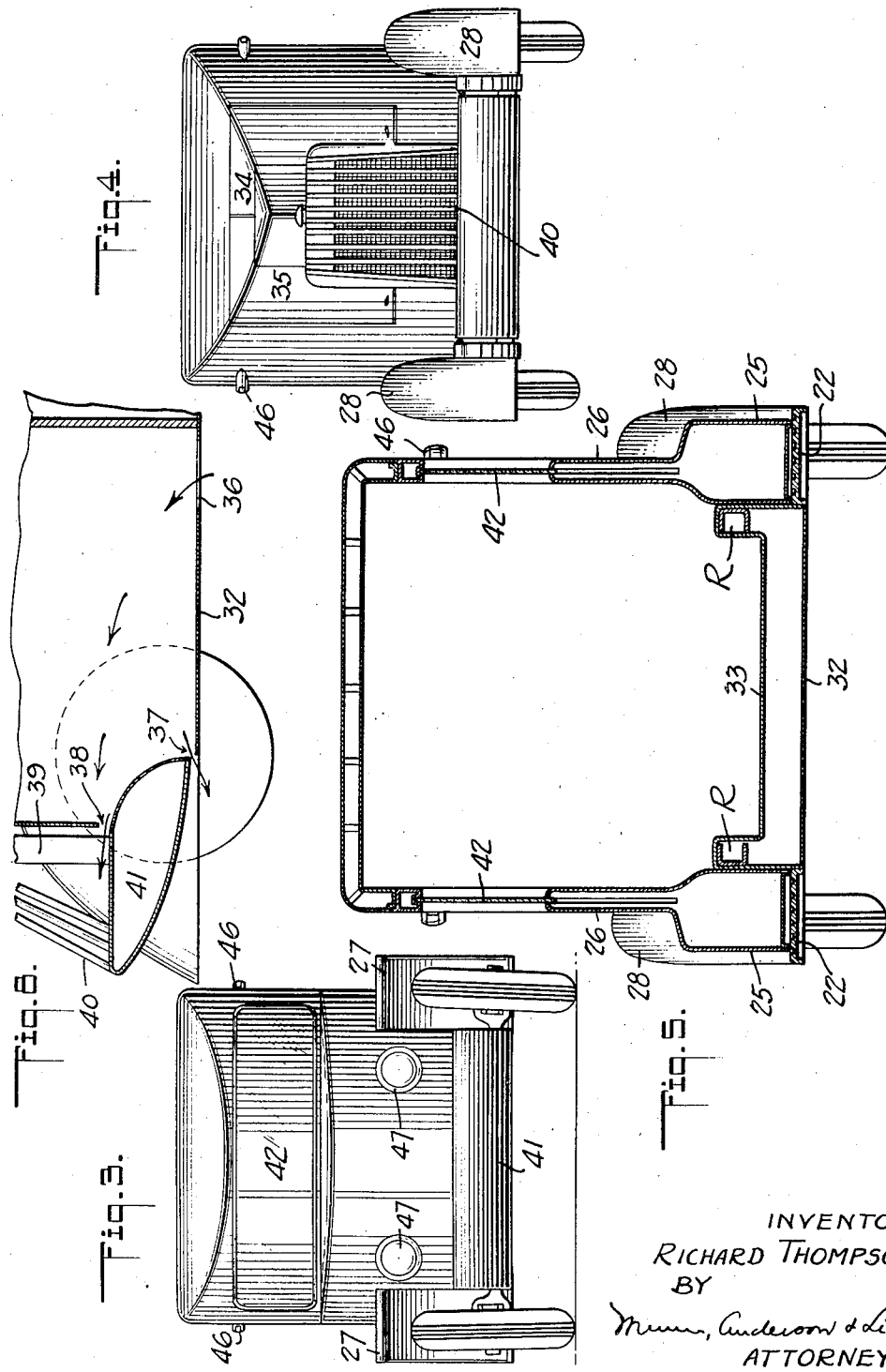

Patented Feb. 23, 1937

2,071,592

UNITED STATES PATENT OFFICE 2,071,592

VEHICLE BODY

Richard Thompson, Los Angeles, Calif.

Application March 8, 1935, Serial No. 10,108

1 Claim. (Cl. 180—68)

This invention relates to vehicle bodies and has particular reference to automobile bodies.

The novelty of the invention finds expression in the aerodynamic streaming of the body to prevent to a practical degree the tearing loose of the air from the profile of the body and the doubling back of the air upon itself in lower pressure eddies and whirls such as would result in materially slowing up the air flow and the production of a braking drag on the body.

An important object is to provide a body having its power plant in the rear or stern rather than in the stem or forepart of the body and the formation of a frontal area or rounded nose which is smoothly faired into conjoined surfaces of the body in a manner to force the air to flow smoothly along courses that are devoid of turbulence forming or inducing protuberances.

Another object is to provide a body in which the air flows smoothly from stem to stern thereof and toward the radiator of the cooling system of a rearwardly mounted power plant and the air utilized to exhaust the heat and gases from the compartment in which the power plant is mounted.

According to correct principles of aerodynamic engineering, it is recognized that the frontal or projected area of the body of an automobile should be smooth and rounded and also smoothly faired into the sides of the body so as to prevent the air from encountering sharp corners and abrupt surfaces that would produce eddies and whirls, and that all exposed surfaces of the body should be either smoothly faired into each other or, if, in the nature of protuberances such as the customary ornate accessories, they, too, should be streamlined. It is therefore a further object of the invention to provide an organized body assembly which closely follows these correct principles of aerodynamic streamlining and lends itself very largely to the elimination of considerable air buffeting and vibration and which, in addition thereto, will provide for an increase in riding comfort.

A further object is to provide means for housing the power plant in a manner to cause the surfaces of the hood thereof to come flush with and therefore smoothly faired into adjacent surfaces of the body and the hood formed to enable the air to freely enter and leave the space from beneath same as distinguished from those types of construction in which the air is admitted beneath the hood through louvers at the sides of the hood.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

In the drawings:

Figure 1 is a view in top plan of a body embodying the invention, parts being shown in section for clearness;

Figure 2 is a view in side elevation thereof;

Figure 3 is a front view of the body;

Figure 4 is a rear view of the body;

Figure 5 is a vertical transverse section taken on the line 5—5 of Figure 2;

Figure 6 is a detailed transverse section taken on the line 6—6 of Figure 2;

Figure 7 is a bottom plan view of the body;

Figure 8 is a view taken substantially on the line 8—8 of Figure 7;

Figure 9 is a schematic plan view of a modified form of the invention.

Referring to the drawings, 15 designates the body which, in horizontal section or in top plan consists of an ellipsoidal fore part 16 and a conic aft part 17 which extends to infinity and whose infinity coincides with the longitudinal center of the body. The roof of the body extends gradually upward so that the greatest vertical distance from top to bottom of the body is approximately at the line A—B. The top then follows an aerofoil contour and the shortest distance from top to bottom of the body thus falls at the tail thereof as shown in Figure 2. The sides of the body follow the contour of the top and all surfaces are smoothly faired into each other. The blunt and fairly rounded frontal area of the body is stepped, so to speak, to provide a base structure 18, the interior of which is roomy to comfortably accommodate the legs of the front occupants. I have thus far described a form of body which is blunt and streamlined similar to the leading edge of an aerofoil and which is sharper in the direction of the trailing edge or tail, whereby the air travels in the direction indicated by the arrows in Figures 1 and 2, there being no sharp corners or abrupt surfaces that would be conducive to the production of eddying currents and back pressure. The air streams thus hug closely to all surfaces of the body from stem to stern thereof and a streamline configuration is had that will insure the smallest possible resistance to the movement of the air and eliminate the braking drag ordinarily accompanying body construction, which, while ornate, offers turbulence inducing surfaces and protuberances and impede forward motion of the vehicle.

The aforementioned body 15 is mounted on a chassis 19 having a front wheeled axle 20, a rear driven wheeled axle 21, and embodied in the body construction are side running boards 22, a narrow, laterally and downwardly inclined deck 23 provided with vertical side walls 24, of which sections 25 thereof form the lower portions of swinging doors 26 in the fore part of said body, the external surfaces of said portions being smoothly faired into the aft sections of said walls, as will be fully appreciated on reference to Figures 1 and 2 of the drawings. The inclining of the deck 23 as above stated is desired in order that water may readily drain therefrom. The body has fenders 27 for the wheels of the front axle 20, and fenders 28 for the wheels of the rear axle, and, as illustrated, the front fenders are rearwardly dished at 29 to conform exteriorly to the arc of movement of the doors 26 when opening and closing same and to enable all conjoined surfaces to be smoothly faired into each other. The interior surfaces of the front fenders behind the front wheels function to laterally deflect water from beneath the fenders, as will be appreciated. These front fenders are streamlined and function to divide the air currents to enable parts thereof to smoothly follow along the upper surfaces of said fenders, thence along the course indicated by the arrows (a) in Figure 1 to the point of infinity of the body, the current of air beneath said fenders taking the course indicated by the arrows (b).

The rear fenders 28 are provided with blunt transversely rounded front ends 30 which terminate at the running boards 22 and from said front ends the fenders are streamlined to their rear ends 31. The sides of these fenders are vertically disposed and perfectly smooth, and the fenders house substantial parts of the rear wheels, as shown in Figure 2.

The lower portion of the body is entirely closed in by a smooth surfaced bottom 32 so that none of the structural parts of the chassis will be exposed, thus materially reducing the braking drag ordinarily produced beneath the body during movement of the air currents. The floor structure 33 for the body is hung from the longitudinal rails R of the chassis as shown in Figure 5.

As previously stated, the vehicle is of the type designed to accommodate the power plant in the rear end of the body, whereby the front end of the body can be used to proper advantage in the intended streamlining of the body, and to prevent eddying currents and whirls from being formed incident to the heretofore vent cowls of the motor hood, a hood 34 is provided, the surfaces of which are smoothly faired into conjoined surfaces of the body both at the top and at the sides thereof, and said hood has a cover 35 by means of which access can be had to the motor as and when desired. To provide proper ventilation for the motor, the bottom 32 is formed with an air intake passage 36 through which a current of air can pass into the motor space, thence discharged therefrom from the outlet orifices 37 and 38 at the rear of the body. In this manner a constant suction is induced beneath the hood and the excess hot air and the gases and fumes will be rapidly discharged to the atmosphere.

Mounted upon the chassis 19 at the rear thereof is a radiator 39 for the water cooling system of the motor, the rear of which is covered by a grill or grating 40, and, as illustrated, said radiator is mounted directly above the fuel tank 41, the bottom of which is substantially smoothly faired into the bottom 32 of the body.

A body such as disclosed is preferably provided with a front window 42 which follows closely the entire frontal contour of the blunt nose of the body to the front edges of the doors 26, and which is faired into the sides of the body at the front of the nose. The doors 26 are provided with windows 43, which come as nearly flush with the outer surfaces of the doors as possible.

All accessories, such as the handles 44 on the doors, the handle 45 of the hood cover 35 and the hinges 46 of the doors are streamlined as shown, and to further reduce resistance to forward motion of the vehicle, the headlights 47 are countersunk into the nose of the body, with the lenses shaped and smoothly faired into the surfaces of the nose.

I have thus provided a streamlined body the use of which will result in a material saving of fuel in that less energy will be required to propel the vehicle equipped with such body and at a higher rate of speed than was possible heretofore.

In the schematic illustration of the modified form of invention shown in Figure 9, the radiator 50 is streamlined to offer less resistance to the movement of the air flow at the point of infinity of the body 51 and to prevent more or less absolutely the production of eddy currents and whirls at the back of the body. In the first described form of the invention, a conventional radiator is employed.

The enclosing bottom 32 for the chassis 19 has its forward end curved at 32a into the transverse surface 53 in front of the nose of the body to eliminate resistance to the movement of air at this point. In Figure 1 of the drawings it will be noted by the directions of the arrows that the air currents flow along the deck 23, which latter substantially encompasses the base of the body and that by curving the surfaces into each other, that is to mean the deck surfaces and the upper surfaces of the front fenders, no protuberances are offered the free flow of the air currents. The currents closely follow the contour lines of the body from stem to stern thereof.

I claim:

The combination with an enclosed chassis, of a streamlined body mounted thereon and provided with a conic aft end in horizontal section, the infinity of which coincides with the longitudinal center of the body, and a radiator for a cooling medium disposed vertically and transversely beyond the rear of said aft end of the body so as to be in the path of air flowing rearwardly along opposite sides of said aft end.

RICHARD THOMPSON.